(12) United States Patent
Mutreja et al.

(10) Patent No.: US 11,375,015 B2
(45) Date of Patent: *Jun. 28, 2022

(54) DYNAMIC ROUTING OF FILE SYSTEM OBJECTS

(71) Applicant: Microsoft Technology Licensing, LLC, Redmond, WA (US)

(72) Inventors: Tanu Mutreja, Redmond, WA (US); Nir Ben-Zvi, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/160,092

(22) Filed: Jan. 27, 2021

(65) Prior Publication Data

US 2021/0218809 A1 Jul. 15, 2021

Related U.S. Application Data

(63) Continuation of application No. 15/610,495, filed on May 31, 2017, now Pat. No. 10,938,902.

(51) Int. Cl.
| | |
|---|---|
| *H04L 29/08* | (2006.01) |
| *G06F 16/16* | (2019.01) |
| *G06F 16/182* | (2019.01) |
| *H04L 67/1097* | (2022.01) |
| *H04L 67/63* | (2022.01) |

(52) U.S. Cl.
CPC ........ *H04L 67/1097* (2013.01); *G06F 16/164* (2019.01); *G06F 16/182* (2019.01); *H04L 67/327* (2013.01)

(58) Field of Classification Search
CPC ... G06F 16/164; G06F 16/182; H04L 67/327; H04L 67/1097
See application file for complete search history.

(56) References Cited

U.S. PATENT DOCUMENTS

| | | | | |
|---|---|---|---|---|
| 2002/0143914 | A1* | 10/2002 | Cihula | H04L 41/0893 709/223 |
| 2014/0365989 | A1* | 12/2014 | Agrawal | G06F 8/20 717/100 |
| 2015/0081624 | A1* | 3/2015 | Masse | G06Q 10/103 707/608 |
| 2016/0191466 | A1* | 6/2016 | Pernicha | H04L 63/20 726/1 |

(Continued)

*Primary Examiner* — Abdullahi E Salad
(74) *Attorney, Agent, or Firm* — Shook, Hardy & Bacon L.L.P.

(57) ABSTRACT

Methods, systems, and apparatuses are described for dynamic management of file system objects (e.g., a file or a directory). Such management includes syncing, routing, and storing capabilities. A file system object may be tagged with one or more tags based on at least one of file system object content or file system object location. Dynamic rules that control routing of file system objects to one or more locations based on the one or more tags are accessed and searched for an applicable rule. The file system object may be routed and/or stored based on the applicable rule. The rules may specify allowable locations as well as locations that are not allowed for a given file system object. The location may be a cloud-based location, a location that is on the premises of the enterprise, a location provided by and/or serviced by a competing entity, etc.

20 Claims, 6 Drawing Sheets

(56) References Cited

U.S. PATENT DOCUMENTS

2017/0046381 A1* 2/2017 Corbett ............. G06F 16/24539
2017/0193003 A1* 7/2017 Vijayan ................. G06F 3/0641
2017/0244767 A1* 8/2017 Jana .................... H04L 12/1863
2017/0310625 A1* 10/2017 Hu .......................... H04L 51/26

* cited by examiner

DYNAMIC ROUTING OF FILE SYSTEM OBJECTS

CROSS REFERENCE TO RELATED APPLICATION

This application is a continuation of allowed U.S. application Ser. No. 15/610,495, filed on May 31, 2017, titled "Dynamic Routing of File System Objects," which is incorporated by reference herein in its entirety.

BACKGROUND

The increasing growth of data is causing higher spending on storage and demanding better data management. Regulations impose a need to better handle sensitive information such as personal information and financial documents. Leakage of business-critical information or personal information is problematic. Existing solutions of data management attempt to balance various management scenarios. For example, existing solutions may focus on improved security to prevent data leakage, or ease of data management (e.g., backup, archival), although the solutions may not be interoperable. These solutions may work based on where a file is located (e.g., in a particular folder), but not based on the business value of the file to the enterprise that owns it. The folder-based approach has users figure out where to store their data based on complex company policies. It is common to place files in the wrong folder in the folder-based approach.

Many solutions exist in the emerging market space of enterprise file sync and share (EFSS). Example solutions include Microsoft® OneDrive®, Microsoft® OneDrive® for Business, Box®, DropBox®, Google® Drive, Egnyte®, and Accellion®. Most of these solutions offer some sort of sync capability that enables a file to be synchronized and/or replicated across various cloud computing systems or geographical locations.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and apparatuses are described for enabling dynamic rule-based file system object (e.g., a file or a directory) management in an enterprise file system. In particular, rule-based logic may be utilized to determine which file system objects may be routed to a cloud-based location, as well as the specific cloud-based location in which to store or to direct the file system objects.

Further features and advantages of the invention, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further explain the principles of the embodiments and to enable a person skilled in the pertinent art to make and use the embodiments.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

Introduction

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Example Embodiments

As organizations and enterprises face increasing data costs and risks, better insights into enterprise data may be desired to enable better data management based on business value. According to example embodiments, file system objects (FSOs) may be automatically classified (e.g., based on location and/or content) such that actions or policies may be automatically applied based on the classification. System administrators are enabled to define policies that span across an enterprise or other entity to better translate business requirements to information technology actions.

For example, a company may have a policy to keep personal information on the premises of the company rather than storing it in the cloud. This policy may be defined by a system administrator to automatically apply to file system objects (e.g., files or folders created by a human resources application) such that these file system objects will remain on the premises and not be moved to any cloud-based storage. Moreover, when new data directories are added, the rules and actions can remain the same since the actions are taken per business criticality of the file system objects regardless of their location. Thus, cost of data management (e.g., backup, archival, hierarchical storage management, etc.) may be reduced, for example, because file system objects may be automatically expired to reduce storage purchasing needs, file system objects may be moved to less expensive or sensitive storage, backup of file system objects may be optimized, or business critical files may be replicated and/or moved. In this manner, security risks are better managed because sensitive files are not routed to third party servers, or sensitive information may be placed in an encrypted storage repository rather than an unencrypted one, etc.

Embodiments described herein enable dynamic rule-based file system objects management as part of an enterprise (or other entity) file sync and share solution. Such management includes syncing, routing, and storing capabilities. In an example embodiment, a file system object tagged with one or more tags based on at least one of file system object content or file system object location is received. Dynamic rules that control routing of file system objects to one or more locations based on the one or more tags are accessed. The dynamic rules may be searched for an applicable rule for routing the file system object, and the file system object is routed and/or stored based on the applicable rule.

For instance, an enterprise administrator may define rules with condition(s) to check and corresponding action(s) to take (e.g., where a file system object may be directed to and/or stored). The rules may specify location restrictions for a given file system object, such as allowable locations as well as locations that are not allowed for the given file system object. The rules may be defined at a file level or a directory (folder) level. The location may be a cloud-based location, a location that is on the premises of the enterprise, a location on local computer storage, a location provided by and/or serviced by the enterprise or a competing entity, or elsewhere.

In an example embodiment, the interpretation of a location may be automatically determined without input from the administrator. In other words, how a particular location is defined or viewed as allowable or not allowable for a particular file system object or for a particular entity/provider may be automatically determined.

In another example embodiment, before performing any syncing or sharing activity for a file system object, a file system agent may scan the file system object for its contents, including properties, to use to tag the file system object. Subsequently, routing rules may be compared to the tags and/or to see if one or more of the applied tags matches any rules. If a matching rule is found, the file system object may be automatically synced, routed, and/or stored as specified by the matching rule without further input from the administrator.

Figure 1:
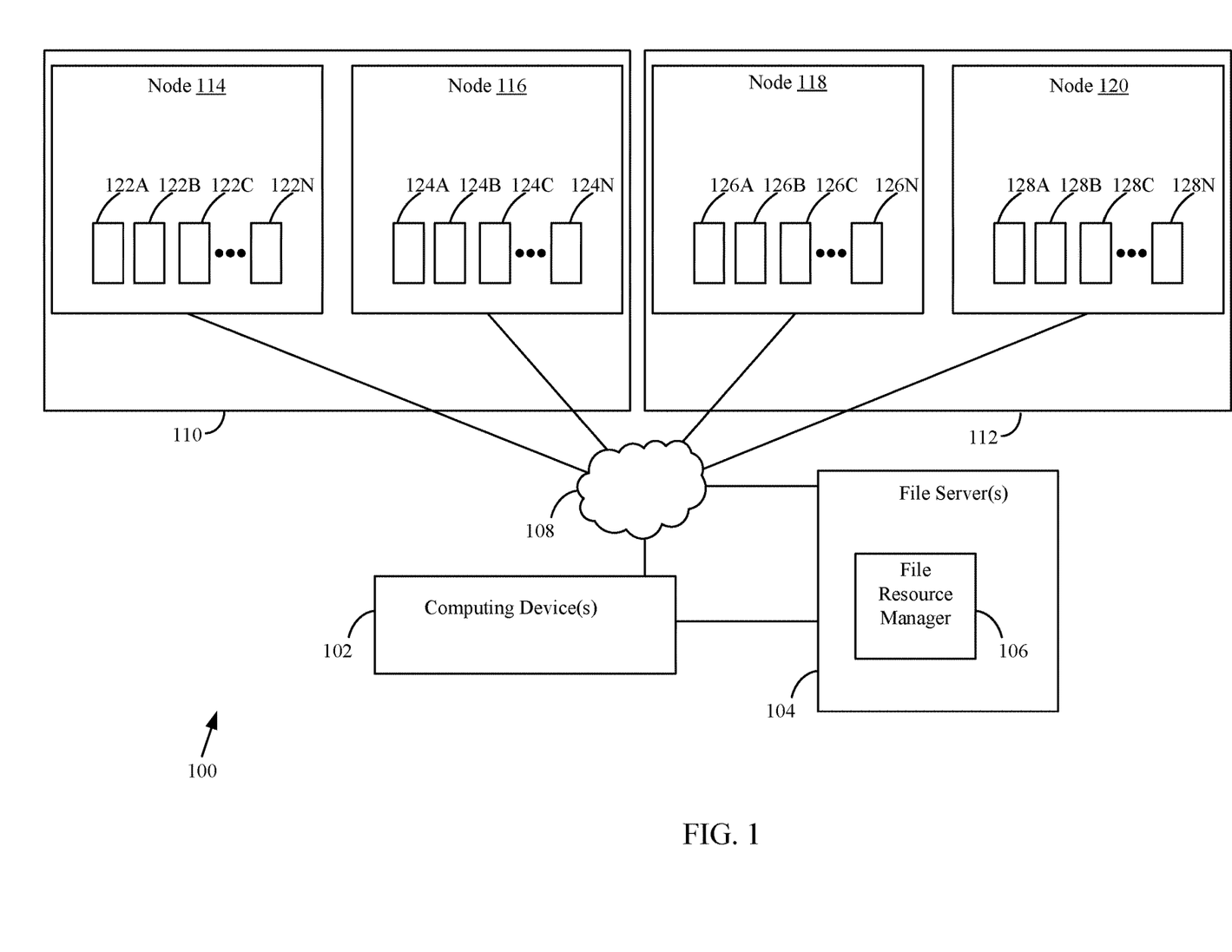
FIG. 1 shows a block diagram of a system for dynamically managing file system objects, according to an example embodiment.

The management of file system objects may be implemented in various manners in embodiments. For example, FIG. 1 shows a system 100 for automatically managing file system objects to route and/or store the file system objects based on predefined rules. In an embodiment, system 100 may be implemented as an enterprise or other entity file sync and share (EFSS) system. As shown in FIG. 1, system 100 includes one or more computing devices 102, one or more file servers 104, a first cluster 110 having node 114 and node 116, and a second cluster 112 having node 118 and node 120. Computing device(s) 102, file server(s) 104, and each of clusters 110 and 112 may be communicatively connected via a network 108. Network 108 may comprise one or more networks such as local area networks (LANs), wide area networks (WANs), enterprise networks, the Internet, etc., and may include one or more of wired and/or wireless portions.

Clusters 110 and 112 may form a network-accessible server set. For example, each of nodes 114, 116, 118 and 120 may comprise a group or collection of one or more servers (e.g., computing devices) that are each hosted on a network such as the Internet (e.g., in a "cloud-based" embodiment) to store, manage, and process data. In an embodiment, nodes 114, 116, 118, and/or 120 may be co-located (e.g., housed in one or more nearby buildings with associated components such as backup power supplies, redundant data communications, environmental controls, etc.) to form a datacenter, or may be arranged in other manners. In an example embodiment, nodes 114, 116, 118 and 1120 may share physical resources (e.g., power supplies, network) and/or have the same or similar structures (e.g., hardware, configurations) for ease of management. Additionally, there may be isolation among clusters 110 and 112 for resiliency, redundancy, and failure management purposes such that a failure in a single cluster may not impact other clusters. Accordingly, in an embodiment, nodes 114, 116, 118 and 120 may each be a datacenter in a distributed collection of datacenters. The datacenters may be owned and/or operated by a same owner (e.g., an enterprise) and/or different owners (e.g., different enterprises, vendors, etc.). It is noted that while FIG. 1 shows two clusters 110 and 112 each having two nodes, system 100 may include any number of clusters, and each cluster may include any number of nodes.

In accordance with an embodiment, nodes (e.g., nodes 114, 116, 118 and 120), and/or clusters (e.g., clusters 110 and 112) located in a first geographic region (e.g., North Central US) may be paired with a second plurality of nodes and/or clusters located in a second geographic region (e.g., South Central US). The first plurality and the second plurality maybe be collectively referred to as a region pair. The network-accessible server set may comprise any number of region pairs, where each region pair covers a different portion of the world. Moreover, each region of a region pair may include one or more availability zones. Each availability zone may include one or more clusters (e.g., clusters 110 and 112) located within that region.

Each of node 114, node 116, node 118, and node 120 may include and/or execute one or more computing resources (e.g., computer networks, servers, storage, applications and services). As shown in FIG. 1, node 114 may host and execute resources 122A-122N, node 116 may host and execute resources 124A-124N, node 118 may host and execute resources 126A-126N, and node 120 may host and execute resources 128A-128N, where N is any integer greater than 1. Each of nodes 114, 116, 118 and 120 may be configured to co-host and execute any number of resources.

Note that the variable "N" (or other variable) is appended to various reference numerals for illustrated components to indicate that the number of such components is variable, with any value of 1 and greater. Note that for each distinct component/reference numeral, the variable "N" has a corresponding value, which may be different for the value of "N" for other components/reference numerals. The value of "N" for any particular component/reference numeral may be less than 10, in the 10s, in the hundreds, in the thousands, or even greater, depending on the particular component and/or implementation.

Computing device(s) 102 may be any type of stationary or mobile computing device(s), including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server.

File server(s) 104 is configured to manage data (e.g., file system objects) for system 100. File server(s) 104 may be implemented in any type of stationary or mobile computing device(s), including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server.

As shown in FIG. 1, file server(s) 104 includes a file resource manager 106. In an embodiment in which system 100 is an EFSS solution, file resource manager 106 may be implemented as a client-side agent. File resource manager 106 is configured to dynamically manage data based on rules by checking predefined rules for at least one matching rule associated with a file system object and routing the file system object accordingly. For example, file resource manager 106 may determine whether the file system object should remain on the premises (e.g., in storage of file server(s) 104) or moved to any cloud-based location (e.g., cluster 110 or cluster 112), or routed to a specific location (e.g., any of nodes 114, 116, 118 or 120) based on one or more matching rules. In the embodiment of FIG. 1, file resource manager 106 is shown to be in file server(s) 104, which may be located on the premises of the enterprise. Alternatively and/or additionally, file resource manager 106 may also be located in a cloud-based location, e.g., any of nodes 114, 116, 118 or 120, a separate node/server, or as a server-side agent.

Figure 2:
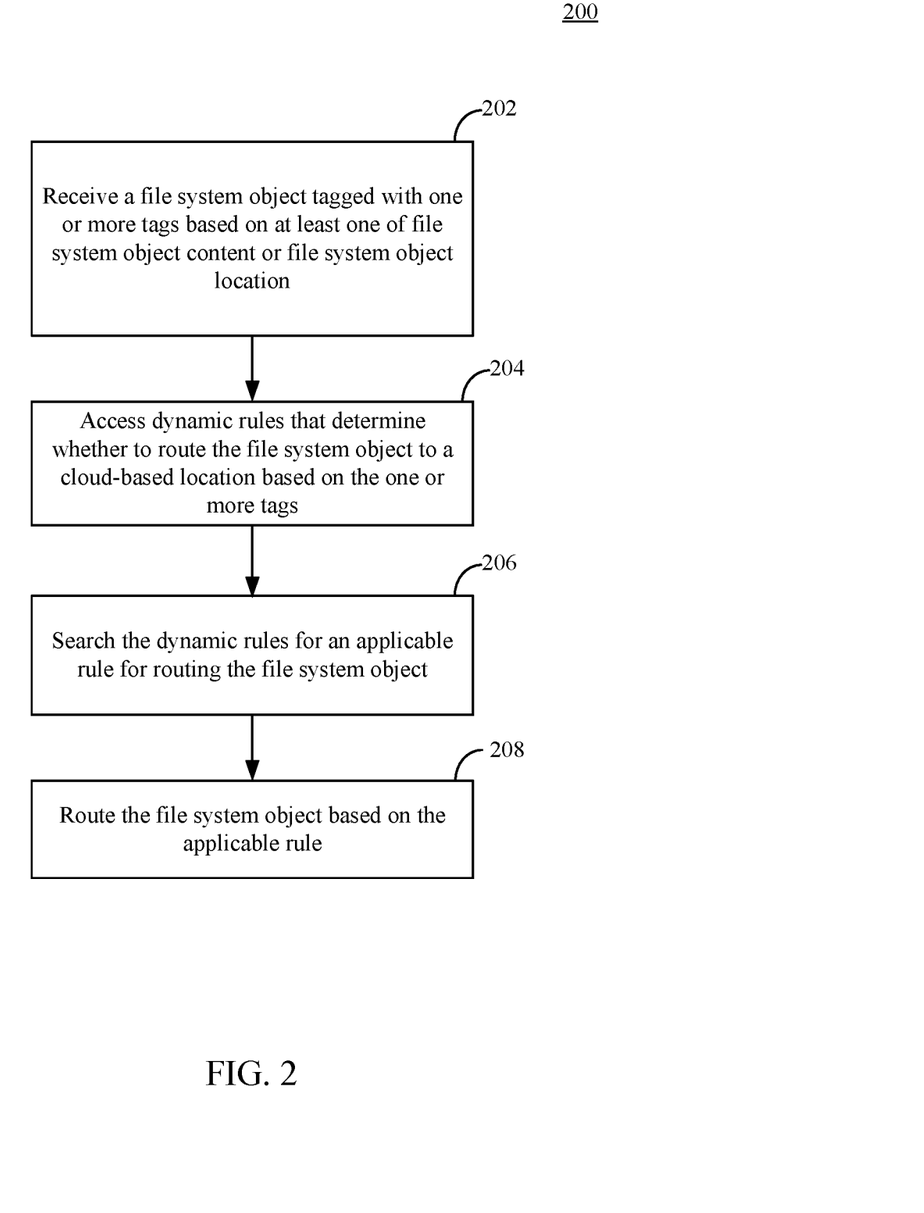
FIG. 2 depicts a flowchart of a method of dynamic routing of file system objects based on rules, according to an example embodiment.
Figure 3:
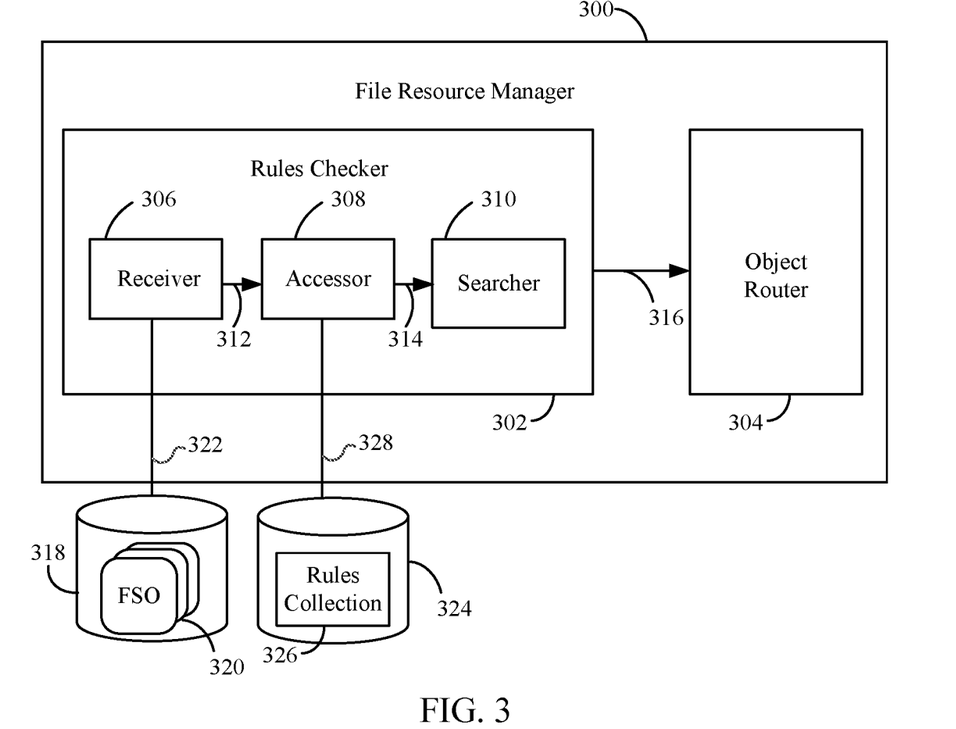
FIG. 3 is a block diagram of a file resource manager, according to an example embodiment.

Embodiments of system 100 may be implemented in various manners. For instance, FIG. 2 depicts a flowchart 200 of a method of dynamic routing of file system objects based on rules, according to an example embodiment. In an embodiment, flowchart 200 may be implemented by file server(s) 104 and file resource manager 106 as shown in FIG. 1. For purposes of illustration, flowchart 200 of FIG. 2 is described with respect to FIG. 3. FIG. 3 shows a block diagram of a file resource manager 300 configured to automatically manage data based on rules, according to an example embodiment. As shown in FIG. 3, file resource manager 300 includes rules checker 302, which is configured to search for a matching rule for a received file system object and object router 304, which is configured to route the received file system object to the location indicated by the applicable, matching rule. Rules checker 302 includes an object receiver 306, a rule accessor 308, and a rule searcher 310. File resource manager 300 is an example of file resource manager 106 of FIG. 1. Flowchart 200 and file resource manager 300 are described as follows. Note that the steps of flowchart 200 may be performed in an order different than shown in FIG. 2 in some embodiments. Furthermore, not all steps of flowchart 200 need to be performed in all embodiments. Other structural and operation embodiments will be apparent to persons skilled in the relevant art(s) based on the following description.

Flowchart 200 begins with step 202. In step 202, a file system object tagged with one or more tags based on at least one of file system object content or file system object location is received. For example, file resource manager 106 or file resource manager 300 may receive a file system object. In particular, as shown in FIG. 3, the file system object may be received at file resource manager 300 by object receiver 306 via communication link 322 (a wired, wireless, or wired/wireless combination connection) from an object storage 318. Object storage 318 may be structured as a database, in the form of a file/folder hierarchy, or in another manner to store file system objects. Object storage 318 may store a plurality of tagged file system objects 320. File system objects 320 may include any number of file system objects, including numbers in the ones, tens, hundreds, thousands, millions, or even greater numbers of file system objects. Each file system object of file system objects 320 may be a database object (e.g., a table), a file, a directory, or other data object of any format that is tagged with one or more tags. Each tag represents a classification value of the corresponding file system object, which may be determined based on properties of the file system object (e.g., indicating personal information, business importance, confidentially, tasks, retention period), and/or determined in another manner.

To be tagged, file system objects 320 of object storage 318 may have been automatically profiled (e.g., by a search of the file system object for one or more keywords whose presence indicate a particular classification) to determine a tag for the file system object, and the determined tag can be applied to the file system object. Alternatively, a file system object may be manually tagged with a manually determined tag, or may be tagged in another manner (e.g., as described in further detail below with respect to FIGS. 5 and 6).

For instance, in an embodiment, object receiver 306 scans the received file system object to determine the tags that are associated with the received file system object. The one or more tag(s) associated with a file system object may be stored in the file system object (e.g., in a header, footer, or body of the file system object, in a property field thereof, etc.) as attributes of the file system object, or may be stored in a table or other data structure linked to the file system object (e.g., the table associates an identifier for the file system object with the one or more tags). In an example embodiment, the classification of a file system object indicated by a tag may be automatic and based on a location of the file system object (a directory, a particular storage device partition, a particular storage device, a particular storage device collection/network, a particular region, etc.), an ownership of the file system object (e.g., a user, an administrator, an enterprise or other entity, etc.), a content of the file system object (e.g., textual information, a word processing document, a spreadsheet, private information, public information, an audio file, a video file, etc.), or other parameters, such as file size or file extension. For instance, the tag-indicated classification may be automatically applied based on a line of business (e.g., file system objects from a human resources application are tagged with "personal information" or a similar indicator when saved, or file system objects that are saved to a patent folder may be tagged with "business confidential"). The classification of a file system object may alternatively be a manual process performed by a user and/or administrator, and/or a user or administrator may be enabled to manual adjust an automatically generated classification. As shown in FIG. 3, object receiver 306 may transmit/provide the tag(s) determined for the file system object to rules accessor 308 as tags 312. Once a file system object has been tagged the tag values may remain with the file system object while it is moved from one location to another, or may be automatically changed pursuant to tags associated with the new location.

In step 204, dynamic rules that determine whether to route the file system object to a cloud-based location based on the one or more tags are accessed. For example, file resource manager 106 or file resource manager 300 may access one or more storage repository or databases that contain pre-defined rules that may be applicable to the file system object. As shown in FIG. 3, rules storage 324 may be accessed by rules accessor 308. As shown in FIG. 3, rules accessor 308 may retrieve rules 328 applicable to tags 312 received for the file system object.

In an embodiment, rules storage 324 may include a rules collection 326 (e.g., a table, list, file, etc.) that contains predefined rules that determine whether (and how) to route file system objects to a cloud-based location based on the one or more tags. Rules 328 retrieved for a particular file system object may specify whether the file system object must remain on the premises of the enterprise that owns it or whether it may be routed to a cloud-based location. If a cloud-based location is allowable for the file system object, rules 328 may indicate a specific cloud-based location for routing and/or storing the file system object. The rules may also specify which locations are not allowable for the file system object, and in such case, file resource manager 106 or file resource manager 300 will not move the file system object to these locations.

Some example rules include: "allowed-storage=onprem" that indicates that the file system object may be stored on the premises of the enterprise only, and "allowed-storage=first_cloud_service" that indicates that the file system object may be stored at the identified first cloud service. Rules may include more than one expressions and/or complex expressions. For instance, rule "allowed-storage=first_cloud_service AND onprem" indicates that the file system object may remain on the premises or be moved to the first cloud service. Another example of a rule includes "allowed-storage=second_cloud_service AND allowed-storage≠third_cloud_service" that indicates that the file system object may be stored on the second cloud service but not allowed on the third cloud service. The dynamic rules may be generated in a manner to avoid conflict among the dynamic rules, for example, by prioritizing the dynamic rules in some manner such as by use of a rule precedent as described below in reference to step 208. For example, in the case of multiple matching or applicable rules, the first rule (e.g., in an ordering maintained in rules collection 326) that matches any of the tags of the file system object may be used to route the file system object. The dynamic rules may be set at a file system object level (e.g., file or directory level); and may be based on file system object properties, file system object content, file system object date of creation, date of modification or date of access, or some other date or date range.

While the rules are depicted as being stored in rules collection 326 in FIG. 3, any other data structure (e.g., multiple tables, lists, arrays, etc.) may be used to store the rules. Also, the rules may be stored in one or multiple storage repositories. In an example embodiment, the dynamic rules may be perpetuated when the file system object is moved to another location, such that new rules do not have to be generated even though there is a location change.

Referring back to FIG. 2, in step 206, the dynamic rules are searched for an applicable rule for routing the file system object. For example, file resource manager 106 or file resource manager 300 may search the dynamic rules for an applicable rule for routing the file system object. As shown in FIG. 3, rule searcher 310 receives rules 314, which includes the rules determined for the file system object being processed. Based on rules 314, rule searcher 310 may determine one or more matching rules applicable to the file system object, indicated as matching rules 316. Matching rules 316 specify whether and where the file system object may be moved and/or stored. It is noted a file system object may be routed and/or stored at more than one locations, as indicated by a matching rule. If no applicable rule is indicated by matching rules 316, file resource manager 106 or file resource manager 300 may send an alert to an administrator and/or follow a default procedure, for example, by keeping the file system object on the premises until the database of rules has been updated and/or a predefined time window has passed before searching the rules collection 326 for matching rules again.

In step 208, the file system object is routed based on the applicable rule. For example, file resource manager 106 or file resource manager 300 may route the received file system object according to the applicable rule found by rule searcher 310, as indicated by matching rules 316. Such routing may include synchronizing the file system object at one or more locations. The one or more locations may be a cloud-based location, a location that is on the premises of the enterprise that owns the file system object, a location provided by and/or serviced by the enterprise or by an entity different from the enterprise (e.g., a competing entity). A cloud-based location may be any of a public, private or hybrid cloud infrastructure that is owned and/or operated by the enterprise and/or other entities. A public cloud may be based on a standard cloud computing model where resources (e.g., applications and storage) may be made available to the general public over a network (e.g., the Internet) by the provider of the public cloud. A private cloud may be a type of cloud computing that is similar to the public cloud but through a proprietary architecture and may be dedicated to a single enterprise. A hybrid cloud may include a combination of the public cloud and private cloud. As shown in FIG. 3, routing information and/or the applicable rule may be transmitted in matching rules 316 to object router 304. Object router 304 may route the received file system object based on the routing information and/or the applicable rule.

If multiple rules are found to be applicable, object router 304 may apply a rule precedent to prevent conflicting rules. The rule precedent, which may also be stored in rules collection 326 or another data structure, sets forth the ranking or order to be applied to the matching rules. The ranking may be manually set by an administrator or automatically determined based on any parameter, e.g., time, location, regulations, business policies, etc. For example, the rule precedent may dictate that the first matching rule is to be applied to the file system object when there are multiple matching rules. The file system object may be directed, routed, synchronized, and/or stored at one or more locations indicated by the applicable rule. The locations may include any storage location, such as a storage location on the premises of the enterprise, a general storage that is cloud-based, or a specific storage location that is in the cloud (e.g., a specific geographical location or a location associated with a specific vendor). In an embodiment, the interpretation of a location may be automatically determined by object router 304 based on matching rules 316 without input from the administrator. In other words, how a particular location is defined or viewed as allowable or not allowable for a particular file system object may be automatically determined. For example, a file system object that is generated in a particular geographic location or by a particular line of business may be constrained in terms where it may be routed and/or stored by regulations, business practices, or any other parameters, and the constraints may be automatically determined and applied to the file system object. When the applicable rule indicates that the file system object is not allowed to be moved to a particular location, object router 304 does not allow the file system object to be routed to the non-allowed location.

As described above, file system manager 300 may be configured to route file system objects according to rules and tags. In further embodiments, file system manager 300 may be configured to apply tags to file system objects, and/or may be configured to generate the rules that are used to route tagged file system objects. Such embodiments are described as follows with respect to FIGS. 4-8.

Figure 4:
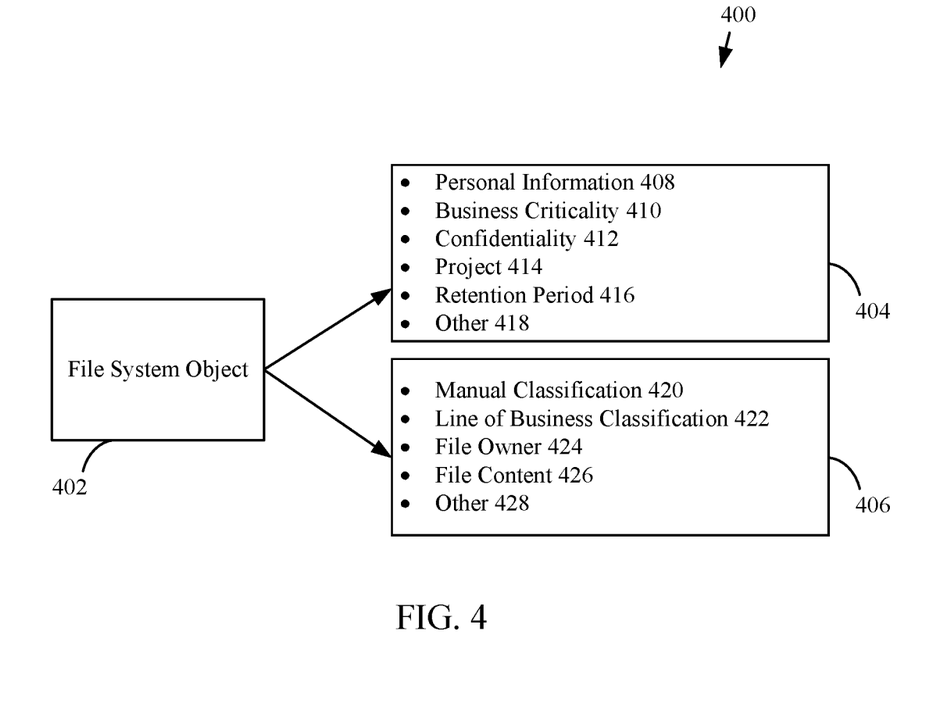
FIG. 4 is a diagram of example tags that may be applied to a file system object, according to embodiments.

In an embodiment, a tag may be applied to a file system object by a tagger. FIG. 4 is a diagram that shows example tags that may be applied to a file system object 402 for purposes of enabling routing of file system object 402, according to an embodiment. For example, as shown in FIG. 4, file system object 402 may include any of tags 404, which include tags related to personal information 408, business importance 410, confidentiality 412, task 414, retention period 416, and/or other tag 418. Any number of these and/or other tags may be applied to a file system object. Non-limiting examples of each of these tags are provided as follows.

Personal information 408 may include information about individuals (e.g., demographic information such as age, sex, height, etc., residential address, etc.), about employees of an enterprise, for example, content that is generated by a human resources application. Personal information 408 may be represented in various ways, such as by textual data (e.g., male, female, etc.) and/or Boolean values, for example, "yes" if the file system object includes personal information and "no" if the file system object does not include personal information. Business importance 410 may include information that pertains to the business and may be represented with an indicator of importance. For example, business critical file system objects may be ordered on a scale from 1 to 5 with 1 being the most critical to the business. Thus, the indicator of importance maybe an integer, although in other cases, may be textual. Confidentiality 412 may include information that indicates whether the file system object includes confidential information, for example, represented by a Boolean value, for example, "true" if the file system object includes confidential information and "false" if not, by "public" or "private" tag values, etc. Confidentiality 412 may further indicate a level of confidentiality (e.g., 10 is highest level most needing to be maintained as confidential; 0 is lowest level).

Task 414 may include information about a specific project or some project aspect. For example, task 414 information may be represented by a string, for example, a textual description of the project and/or its name. Retention period 416 information may indicate how long a file system object should be retained, and may be represented in any suitable manner, such as by an integer (e.g., a length of time) or a date format (e.g., for a specific date). Other tag 418 information includes other information not depicted in FIG. 4 or expressly mentioned herein, but that may be apparent to persons skilled in the relevant art(s) based on the teachings herein.

In an embodiment, each type of tag for a file system object may include a pair of information: the tag name (e.g., such as those listed above) and the tag value. Some tag values require more information (e.g., an ordered list tag requires a list of valid values, etc.) Tag values may include the following non-limiting examples: a Boolean value (e.g., yes/no, true/false), a number/integer, a multiple choice list that includes a list of values where multiple values can be selected, an ordered list that includes a list of values that have an implicit ordering (e.g., high, medium, or low or first, second or last), a string, or a multi-string that allows several unique strings to be combined into a tag. File system object 402 may be tagged with any or all of tags 404. For example, file system object 402 may be tagged with the personal information tag with the value "yes" if it includes personal information, or file system object 402 may be tagged with the confidentiality tag with value "true" if it is placed in the "engineering" directory and/or includes the text "confidential" as part of its content.

A file system object may be tagged in various manners. For example, file system object 404 of FIG. 4 may be tagged according to one or more of tagging techniques 406, which includes: manual tagging 420, line of business tagging 422, file owner tagging 424, file content-based tagging 426, and other tagging technique 428. Manual tagging 420 may be performed by a user or an administrator. For example, an engineer who drafted a document may apply a confidential tag to the document. Alternatively, inherited tagging may be used. For instance, the engineer may save the document as a file in a particular folder called "patent," which may be tagged as confidential, thereby causing the saved document to inherit the confidential tag of the "patent" folder. Line of business tagging 422 may occur when a file system object is tagged based on the line of business associated with it. For example, when a human resources application saves a file to a server, the application may set the "personal information" tag to have a value of "yes" to indicate that the file includes personal information and should be managed accordingly. Automatic tagging may be based on file owner tagging 424, file content-based tagging 426, or other tagging technique 428. For example, dynamic tagging may occur without user input based on ownership (e.g., enterprise), file content (e.g., confidential or secret), or other parameters (e.g., file size, file extension). File system object 402 may be tagged by one or more tagging techniques 406. Such tagging techniques 406 may be applied to file system object by an object tagger, which may apply the tags to the file system object as corresponding tags.

Figure 5:
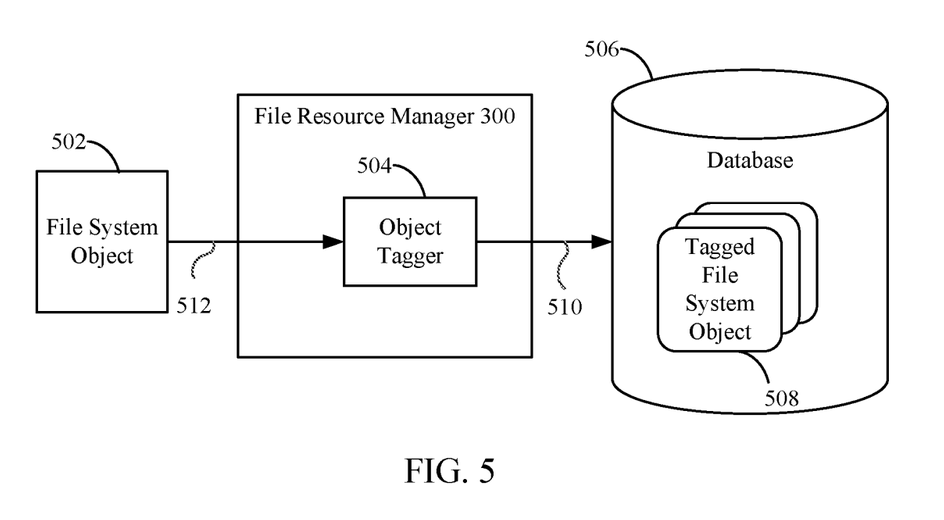
FIG. 5 is a block diagram of a tagger configured to tag file system objects, according to an example embodiment.

For example, FIG. 5 depicts a block diagram of file resource manager 300 configured to tag file system objects, according to an example embodiment. In particular, as shown in FIG. 3, file resource manager 300 includes an object tagger 504. Object tagger 504 is configured to apply tags to file system objects that enable organized routing of the file system objects. Object tagger 504 is described as follows.

As shown in FIG. 5, object tagger 504 receives a file system object 502 via communication link 512. Tagger 504 may automatically tag file system object 502 with one or more tags by changing the file system object 502 to include the one or more tags. For example, tagger 504 may scan file system object 502 for its content, including any properties, and then tag file system object 502 accordingly. Thus, file system object 502 may be altered by the tagging process. File system object 502 may be tagged with any number of tags, such as tags 404 shown in FIG. 4. The output of tagger 504 is a tagged version of file system object 502, which may be sent to a storage repository, such as database 506 via communication link 510. The tagged version of file system object 502 may include extra metadata and/or content (e.g., a header of the file system object) that is not present in file system object 502. Accordingly, the tagged version of file system object 502 includes all the tags needed for classification purposes. While only one file system object is shown as being tagged in FIG. 5, multiple file system objects may be tagged (e.g., in a batch operation) at a time by tagger 504. Database 506 is configured to store a plurality of tagged file system objects 508, among other data. In an embodiment, tagged file system objects 508 may be stored in the same storage as tagger 504.

Figure 6:
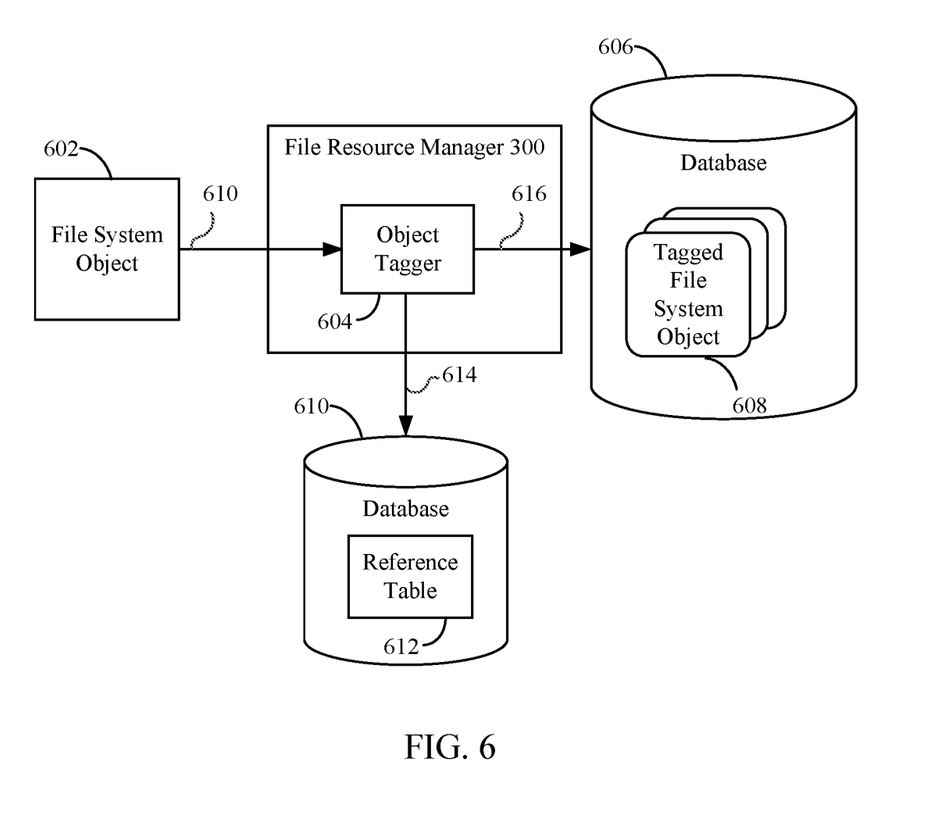
FIG. 6 is a block diagram of another tagger configured to tag file system objects, according to an example embodiment.

The tagging of a file system object may alternatively be implemented as shown in FIG. 6. FIG. 6 depicts an object tagger 604, also configured to tag file system objects, according to an embodiment. Object tagger 604 shown in FIG. 6 may be implemented in file server(s) 104 shown in FIG. 1 and/or in file resource manager 106 or file resource manager 300. Object tagger 604 is described as follows.

As shown in FIG. 6, tagger 604 receives file system object 602 via communication link 610. Tagger 604 may automatically tag file system object 602 with one or more tags by populating a database or other data structure with a file system object identifier and the one or more tags associated with the file system object. For example, tagger 604 may scan file system object 602 for its content (including properties) and then tag file system object 602 accordingly. In this embodiment, rather than altering file system object 602, tagger 604 populates a reference table 612 with the tags of file system object 602. Reference table 612 may be stored in a storage location, such as database 610 and is accessible to tagger 604 via communication link 614. The tags of file system object 602 may be placed in reference table 612 in association with a file system object identifier representing file system object 602 along with one or more tags representing the tags of file system object 602. File system object 602 may be associated with any number of tags, such as tags 404 shown in FIG. 4. The output of tagger 604 is a tagged version of file system object 502, which may be sent to a storage repository, such as database 606 via communication link 616. The tagged version of file system object 602 may simply be the same as file system object 602 since it is not altered in the tagging process as relevant data are extracted and placed on reference table 612. Thus, the tagged version of file system object 602 may not include all the data needed for classification purposes. As such, when file system object 602 is received for classification, reference table 612 may be consulted to obtain the necessary information. While only one file system object is shown as being tagged in FIG. 6, multiple file system objects may be tagged (e.g., in a batch operation) at a time by tagger 604. Database 606 is configured to store a plurality of tagged file system objects 608, among other data. For example, reference table 612 and tagged file system objects 608 may all be stored in one of database 606 or database 610 or stored in the same location as tagger 604.

The decision of which mechanism (e.g., tagger 504 or tagger 604) to use to tag a file system object may be made by an administrator or automatically, e.g., by a file server (e.g., file server(s) 104). This decision may be made based on a type of file system object, for example.

Figure 7:
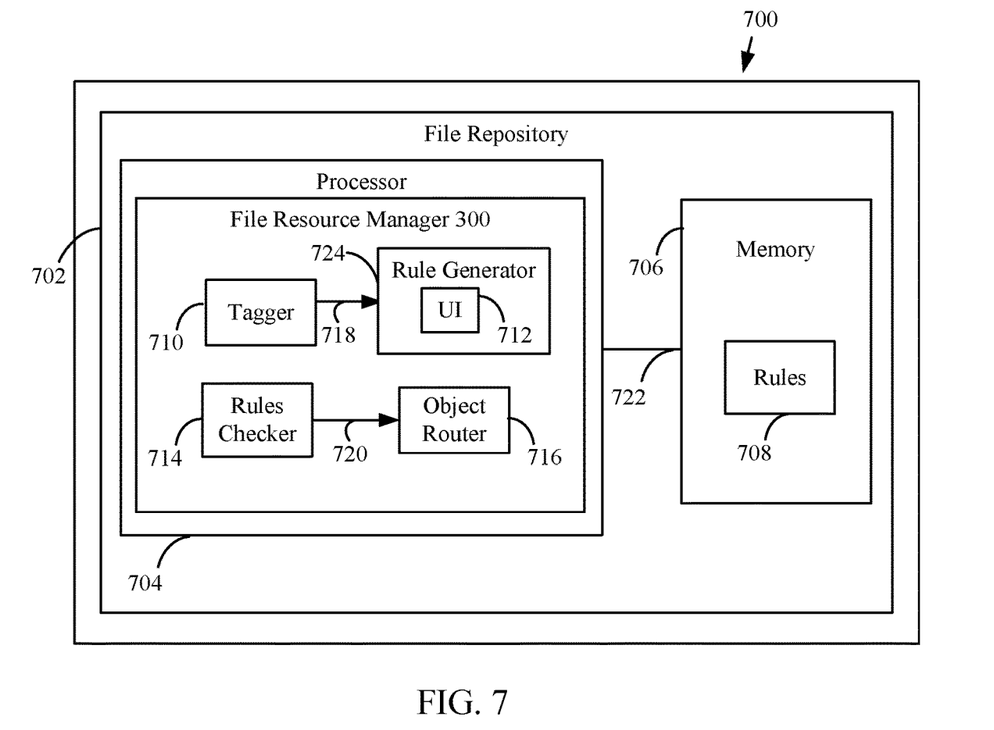
FIG. 7 is a block diagram of a file repository, according to an example embodiment.

In an example embodiment, the dynamic routing of a file system of a file system object may be performed by a computing device. For example, FIG. 7 is a block diagram of a computing device 700, according to an example embodiment. Computing device 700 is configured to tag file system objects, generate rules that determine where the file system objects may be routed and/or stored, perform a check of the rules for a particular file system object, and route and/or store that particular file system object according to any matching rule. Computing device 700 may include at least one file repository 702, which includes at least one processor 704 (e.g., a central processing unit, a microprocessor, a multiprocessor, etc.) and memory 706. Processor 704 may load and execute file resource manager 300 (e.g., from storage). These elements are described as follows.

As shown in FIG. 7, file resource manager 300 includes tagger 710 configured to tag file system objects, a rule generator 724 (that may include user interface (UI) 712) configured to enable generation of rules for routing of file system objects, a rules checker 714 configured to check the rules for a received file system object, and router 716 configured to route and/or store the received file system object according to any matching or applicable rule.

Tagger 710 is an example of tagger 504 shown in FIG. 5 or tagger 604 shown in FIG. 6. In an example embodiment, tagger 710 receives a file system object and tags it with predefined tags and/or based on its content. Information of file system objects (e.g., tags) may be transmitted to rules generator 724 via communication link 718.

Rule generator 724 is configured to facilitate rule generator automatically or by manual interaction by a user and/or administrator (e.g., interacting with UI 712). As shown in FIG. 7, rule generator 724 may generate rules 708, which hare stored in memory 706 or other storage (e.g., via communication link 722). Rules 708 may include any number of rules configured for routing of file system objects based on tags. Each rule generated by rule generator 724 may include a rule name and a rule scope (rule logic). The rule name may indicate how the rule relates to a tag value of a file system object, and the rule scope may include logic configured to differentiate among the different file system object categories. For example, the rule logic or mechanism for routing engineering file system objects may be different from the logic used to route finance file system objects. Multiple mechanisms may be used in a generated rule.

For example, all files within a folder may be tagged by object tagger 710 with the same or different tag values, such as tagging all files within the "engineering" folder with a tag value of "medium secrecy" for a confidentiality tag. Rules generator 724 may generate a rule that is configured to route the files in the folder (or the folder and its contents as a whole), based on the tag values.

As another example, object tagger 710 may tag file system objects based on their respective content. In operation, object tagger 710 may search for text or patterns (e.g., similar to a search indexer) and if certain text or patterns are found, then the file system object may be tagged based on the text or patterns found. Object tagger 710 may implement one or more search parameters for determining tags, which may result in multiple tags being applied to a file system object. For example, search parameters may include "confidential" and/or "private," and both of these key words may be found within the same search. In this case, multiple tag values may be assigned to the file system object during the tagging process. Rule generator 724 may generate a rule that is configured to route the file system objects based on these tag values.

Rule generator 724 may be configured to automatically generate rules, or enable a user to configure rules either from scratch or to configure existing rules. For instance, UI 712 may enable a user to input text/patterns and/or logic (e.g., an expression, a string, etc.) desired for a rule to be generated to route file system objects based on tag values. For example, UI 712 may include a graphical user interface (GUI) that displays one or more forms and/or other UI controls that enable a user to configure a rule, including assigning a rule name and configuring logic of the rule. Rule generator 724 may be alternatively or additionally configured to automatically analyze tags applied to file system objects and to generate rules based thereon. For instance, rule generator 724 may implement artificial intelligence (AI), including machine learning, to monitor how files in one or more folders are routed by a user, and may automatically correlate the determined routing to tags applied to the files/folders. Rule generator 724 may in this manner determine and generate a rule that emulates how the user had been manually routing the file system objects, thereby relieving the user of this task.

In yet another example, rules generator 724 may implement a location-based routing mechanism to define rules with conditions/tags to check and corresponding actions to take regarding where a file system object may be routed, synchronized, and/or stored. For example, a generated rule may dictate whether to route file system objects to a cloud-based location based on one or more file system object tags (e.g., tags 404 shown in FIG. 4). The rule may specify whether the file system object should remain on the premises of the enterprise that owns it or whether it may be routed to a cloud-based location based on the tags of the file system object. If a cloud-based location is allowable for the file system object, the rule may indicate a specific cloud-based location for routing and/or storing the file system object. The rule may also specify which locations are not allowable for the file system object, and in such case, the file system object should not be moved to the restricted, non-allowable locations.

Some example rules include: "allowed-storage=onprem" that indicates that the file system object may be stored on the premises of the enterprise only, and "allowed-storage=first_cloud_service" that indicates that the file system object may be stored at the first cloud service. Rules may include more than one expressions or complex expressions. For instance, rule "allowed-storage=first_cloud_service AND onprem" indicates that the file system object may remain on the premises or be moved to the first cloud service. Another rule example is "allowed-storage=second_cloud_service AND allowed-storage≠third_cloud_service" that indicates that the file system object may be stored on the second cloud service but not allowed on the third cloud service. Once defined, the rules may be stored in memory 706 as rules 708 via communication link 722. Rules 708 may also be stored elsewhere (e.g., in a database separate from computing device 700).

Other rule generation mechanisms may be utilized or built by the user or administrator to be implemented for rules generator 724 for specialized needs. For example, an expiration mechanism may be leveraged to move data out of control of users and into the control of an administrator by moving file system objects scheduled for expiration into a specified directory while preserving their directory structure. The administrator may then backup or archive the file system objects and/or delete them. Before the file system objects expire, a notification mechanism may send an email to the administrator and/or the owners of the file system objects notifying them of the set of file system objects that will expire, or the notification mechanism may enter event log entries and/or other customized actions. The expiration rule may expire file system objects based on any condition, for example, names of file system objects matching a supplied pattern, the time lapse amount (e.g., days) since creation of file system objects, the time lapse amount since modification of file system objects, or the time lapse amount since last access of file system objects. For instance, a file system object may be marked for expiration if it has not been modified for 10 years and have a confidentiality tag lower than "high."

Any of the tagging (by tagger 710) and rule generation (by rule generator 724) mechanisms can set values and/or define rules in an aggregated manner, such that multiple tags of a file system object may be used in a single rule. For example, a rule may be set to allow file system objects created over ten years ago but tagged as "confidential" to be moved to a cloud-based location, but file system objects less than 10 years old and tagged as "confidential" may not be moved to a cloud-based location. Tagger 710 may assign multiple values to the same tag of a file system object. For example, a tagging mechanism implemented by tagger 710 may set the confidentiality tag (e.g., shown in FIG. 4 as confidentiality 412) of a file system object to "medium" since the file system object is located in the "engineering" directory. Another tagging mechanism may set the confidentiality tag to "high" because the file system object contains the text "confidential." To resolve such a conflict, the tag values may be aggregated or prioritized in some manner, such as in accordance with a prioritization mechanism (e.g., prioritization logic and/or code), for example, that implements a rule precedent. For example, for yes/no tags, "yes" wins over "no." For a multiple choice list tag, values may be combined into a set. For an ordered list, the highest entry in the list may be favored/selected. For a multi-string tag, the strings may be combined into one set of unique strings. Accordingly, the rule precedent may set forth the action(s) to be taken in the case of conflict. The rule precedent may be determined by the administrator or automatically applied based on any parameter, e.g., time, location, regulation, business policies, etc.

In an embodiment, tagger 710 may re-evaluate existing tag values for a file system object if the file system object and/or the tagging mechanisms have changed. Such re-evaluation process may overwrite any existing values set by the previous tagging process. Because the tagging process may take time, tagging/re-tagging of file system objects may be performed on a scheduled basis as specified by a system administrator. During the tagging (by tagger 710) and rule generation (by rule generator 724), tagger 710 or rule generator 724 may find any file system objects that have not yet been tagged or need to have their tags re-evaluated. Once a file system object has been tagged the tag values may remain with the file system object while it is moved from one location to another, or may be automatically changed pursuant to tags associated with the new location. In addition, the dynamic rules may be perpetuated when the file system object is moved to another location, such that new rules do not have to be generated even though there is a location change. Tagger 710 and/or rule generator 724 may be configured to remove tags from a file system object designated by a system administrator. For example, the removal of a tag may be performed by a command (e.g., clearfiletag).

Returning to FIG. 7, rules checker 714 is an example of rules checker 302 and object router 716 is an example of object router 304, respectively shown in FIG. 3. In an embodiment, a file system object may be received at rules checker 714. The file system object may be stored in a storage repository on the same as or a different computing device than computing device 700. In an embodiment, the file system object may be file or directory and is tagged with one or more tags. Rules checker 714 may scan the received file system object for the associated tags. Rules checker 714 may also determine the associated tags by other means (e.g., checking reference table 612 shown in FIG. 6). Using the tags, rules checker 714 may access predefined rules 708 in memory 706 via communication link 722 to search for applicable rule(s) to determine how to route the received file system object.

Rules 708 may specify whether the file system object is to remain on the premises of the enterprise (or other entity) that owns it or whether it may be routed to a cloud-based location. If a cloud-based location is allowable for the file system object, the rules may indicate a specific cloud-based location for routing and/or storing the file system object. The rules may also specify which locations are not allowable for the file system object, and in such case, the file system object should not be moved to these restricted, non-allowable locations. Some example rules include: "allowed-storage=onprem" that indicates that the file system object may be stored on the premises of the enterprise only, and "allowed-storage=first_cloud_service" that indicates that the file system object may be stored at the first cloud service. Rules may include more than one expressions and/or complex expressions. For instance, rule "allowed-storage=first_cloud_service AND onprem" indicates that the file system object may remain on the premises or be moved to the first cloud service. Another example of a rule includes "allowed-storage=second_cloud_service AND allowed-storage≠third_cloud_service" that indicates that the file system object may be stored on the second cloud service but not allowed on the third cloud service.

Returning to FIG. 7, rules checker 714 may perform a search for applicable rules for routing the file system object based on its tags. The matching or applicable rule may specify where the file system object may be moved and/or stored or may not be moved and/or stored. Additionally, the file system object may be routed and/or stored at more than one locations. If no applicable rule is found, rules checker 714 may send an alert to an administrator and/or follow a default procedure, for example, to keep the file system object on the premises until the database of rules has been updated and/or a time window has passed before searching the rules again.

Once one or more applicable rule(s) is/are identified, routing information and/or the applicable rule(s) may be transmitted to object router 716 via communication link 720. Object router 716 is configured to route, synchronize, and/or store the received file system object based on the routing information and/or the applicable rule(s). If multiple rules are found to be applicable, and the rules are conflicting, a rule precedent may be applied to prevent conflict. The rule precedent, which may be stored in memory 706 with or separately from rules 708, sets forth the ranking or order to be applied to the matching rules. The ranking may be manually set by an administrator or automatically determined based on any parameter (e.g., time, location, regulations, business policies, etc.). For example, the rule precedent may dictate that the first matching rule is to be applied to the file system object when there are multiple matching rules. The file system object may be directed, routed, synchronized, and/or stored at one or more locations indicated by the applicable rule. The locations may include any storage location, such as a storage location on the premises of the enterprise, a general storage that is cloud-based, a specific storage location that is in the cloud (e.g., a specific geographical location or a location associated with a specific vendor), etc. A cloud-based location may be any of a public, private or hybrid cloud infrastructure that is owned and/or operated by the enterprise and/or other entities. A public cloud may be based on a standard cloud computing model where resources (e.g., applications and storage) may be made available to the general public over a network (e.g., the Internet) by the provider of the public cloud. A private cloud may be a type of cloud computing that is similar to the public cloud but through a proprietary architecture and may be dedicated to a single enterprise. A hybrid cloud may include a combination of one or more aspects of the public cloud and private cloud. When the applicable rule indicates that the file system object is not allowed to be moved to a particular location, object router 716 does not route the file system object to the non-allowed location.

Figure 8:
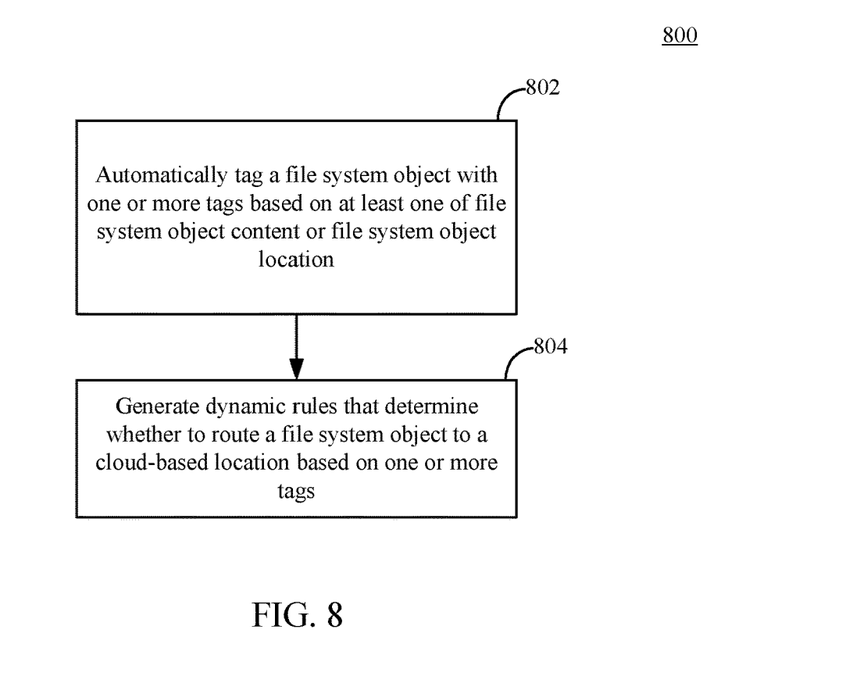
FIG. 8 depicts a flowchart of a method of tagging a file system object and generating rules for routing file system objects to a cloud-based location, according to an embodiment.

Accordingly, in embodiments, a file system object may be tagged and rules may be dynamically generated for routing tagged file system objects in various ways. For instance, FIG. 8 depicts a flowchart 800 of a method of tagging a file system object and generating rules for routing file system objects to a cloud-based location, according to an embodiment. Flowchart 800 is described with respect to computing device 700 for illustrative purposes. The steps of flowchart 800 may be performed in an order different than shown in FIG. 8 in some embodiments. Furthermore, not all steps of flowchart 800 need to be performed in all embodiments. Further structural embodiments will be apparent to persons skilled in the relevant art(s) based on the following description of flowchart 800 and computing device 700.

Flowchart 800 begins with step 802. In step 802, a file system object is automatically tagged with one or more tags based on at least one of file system object content or file system object location. For example, tagger 710 may automatically tag a received file system object based on its tags (e.g., tags 404 shown in FIG. 4), as described above.

In step 804, dynamic rules that determine whether to route a file system object to a cloud-based location based on one or more tags are generated. For example, rules generator 724, including UI 712, may enable dynamic generation of rules 708 that determine how a file system object may be routed, synced, and/or stored, particularly with respect to a cloud-based location. Rules 708 may specify whether the file system object must or may remain on the premises of the enterprise that owns it or whether it may be routed to a cloud-based location. If a cloud-based location is allowable for the file system object, the rules may indicate a specific cloud-based location for routing and/or storing the file system object. The rules may also specify which locations are not allowable for the file system object, and in such case, the file system object should not be moved to these restricted, non-allowable locations. Some example rules include: "allowed-storage=onprem" that indicates that the file system object may be stored on the premises of the enterprise only, and "allowed-storage=first_cloud_service" that indicates that the file system object may be stored at the first cloud service. Rules may include more than one expressions or complex expressions. For instance, rule "allowed-storage=first_cloud_service AND onprem" indicates that the file system object may remain on the premises or be moved to the first cloud service. Another example of a rule includes "allowed-storage=second_cloud_service AND allowed-storage≠third_cloud_service" that indicates that the file system object may be stored on the second cloud service but not allowed on the third cloud service.

Example Computer System Implementations

Computing device(s) 102, file server(s) 104, file resource manager 106, node 114, node 116, node 118, node 120, file resource manager 300, rules checker 302, object router 304, receiver 306, accessor 308, searcher 310, tagger 504, tagger 604, file repository 702, processor 704, tagger 710, rules checker 714, object router 716, rule generator 724, flowchart 200, and/or flowchart 800 may be implemented in hardware, or hardware with any combination of software and/or firmware, including being implemented as computer program code executed in one or more processors and/or stored in a computer readable storage medium, or being implemented as hardware logic/electrical circuitry, such as being implemented together in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 9:
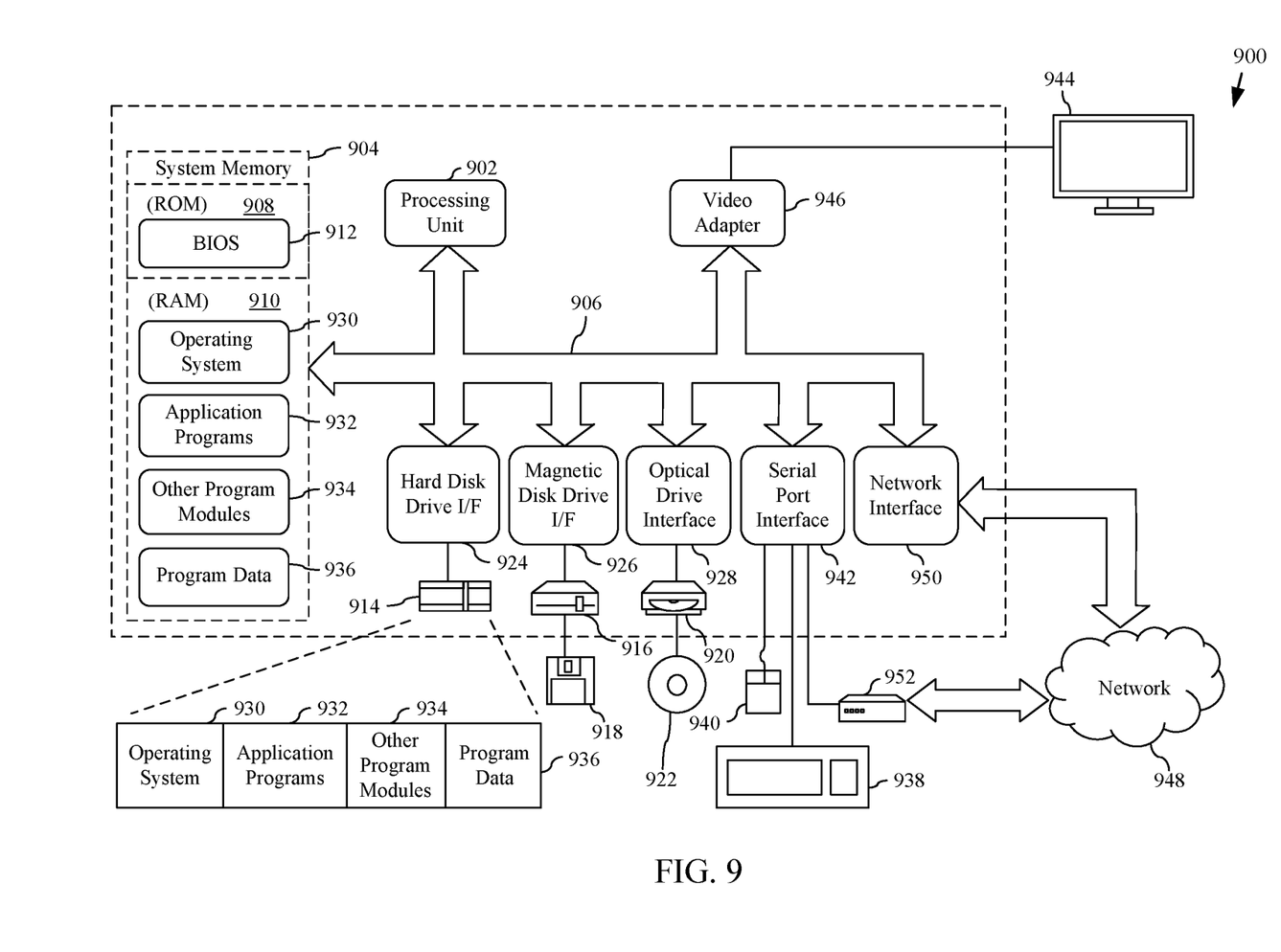
FIG. 9 is a block diagram of an example computing device that may be used to implement embodiments.

FIG. 9 depicts an example processor-based computer system 900 that may be used to implement various embodiments described herein. For example, system 900 may be used to implement computing device(s) 102, file server(s) 104, node 114, node 116, node 118, node 120, and/or file repository 702, as described above. The description of system 900 provided herein is provided for purposes of illustration, and is not intended to be limiting. Embodiments may be implemented in further types of computer systems, as would be known to persons skilled in the relevant art(s).

As shown in FIG. 9, system 900 includes a processing unit 902, a system memory 904, and a bus 906 that couples various system components including system memory 904 to processing unit 902. Processing unit 902 may comprise one or more circuits, microprocessors or microprocessor cores. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

System 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, BLU-RAY™ disk or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 930, one or more application programs 932, other program modules 934, and program data 936. In accordance with various embodiments, the program modules may include computer program logic that is executable by processing unit 902 to perform any or all of the functions and features of file server(s) 104, file resource manager 106, file resource manager 300, rules checker 302, object router 304, receiver 306, accessor 308, searcher 310, tagger 504, tagger 604, file repository 702, processor 704, tagger 710, rules checker 714, object router 716, rule generator 724, flowchart 200, and/or flowchart 800 (including any step of flowcharts 200 and 800).

A user may enter commands and information into system 900 through input devices such as a keyboard 938 and a pointing device 940 (e.g., a mouse). Other input devices (not shown) may include a microphone, joystick, game controller, scanner, or the like. In one embodiment, a touch screen is provided in conjunction with a display 944 to allow a user to provide user input via the application of a touch (as by a finger or stylus for example) to one or more points on the touch screen. These and other input devices are often connected to processing unit 902 through a serial port interface 942 that is coupled to bus 906, but may be connected by other interfaces, such as a parallel port, game port, or a universal serial bus (USB). Such interfaces may be wired or wireless interfaces.

Display 944 is connected to bus 906 via an interface, such as a video adapter 946. In addition to display 944, system 900 may include other peripheral output devices (not shown) such as speakers and printers.

System 900 is connected to a network 948 (e.g., a local area network or wide area network such as the Internet) through a network interface 950, a modem 952, or other suitable means for establishing communications over the network. Modem 952, which may be internal or external, is connected to bus 906 via serial port interface 942.

As used herein, the terms "computer program medium," "computer-readable medium," and "computer-readable storage medium" are used to refer to physical hardware media such as the hard disk associated with hard disk drive 914, removable magnetic disk 918, removable optical disk 922, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 932 and other programs 934) may be stored on the hard disk, magnetic disk, optical disk, ROM, RAM, or other hardware storage medium. Such computer programs may also be received via network interface 950, serial port interface 942, or any other interface type. Such computer programs, when executed or loaded by an application, enable computing device 900 to implement features of embodiments discussed herein. Accordingly, such computer programs represent controllers of the computing device 900.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

Additional Example Embodiments

In an embodiment, a method comprises: receiving a file system object tagged with one or more tags based on at least one of file system object content or file system object location; accessing dynamic rules that control routing of file system objects to one or more cloud-based locations based on the one or more tags; searching the dynamic rules for an applicable rule for routing the file system object, the searching comprises selecting the applicable rule to be a first rule of the dynamic rules to match a tag of the one or more tags when there are multiple matches; routing the file system object based on the applicable rule; and avoiding routing the file system object to a cloud-based location disallowed by the applicable rule.

In an embodiment, the method further comprises: automatically tagging the file system object with the one or more tags by changing the file system object to include the one or more tags.

In an embodiment, the method further comprises: automatically tagging the file system object with the one or more tags by populating a database with a file system object identifier and the one or more tags associated with the file system object.

In an embodiment, the method further comprises: generating the dynamic rules, said generating comprising prioritizing the dynamic rules to avoid conflict among the dynamic rules.

In an embodiment, the dynamic rules are based on at least one of a directory level, a file system object level, a file system object property, a file system object content, a date of file system object creation, or a date range.

In an embodiment, the searching further comprises: when no applicable rule is found, performing at least one of waiting until the dynamic rules are updated to search the dynamic rules again or waiting until a time window has passed to search the dynamic rules again.

In an embodiment, the cloud-based location comprises at least one of a public cloud, a private cloud, or a hybrid cloud.

In another embodiment, a system comprises: at least one processor circuit; and at least one memory that stores program code configured to be executed by the at least one processor circuit, the program code comprising: a rules checker configured to receive a file system object tagged with one or more tags based on at least one of file system object content or file system object location, to access dynamic rules that control routing of file system objects to one or more cloud-based locations based on the one or more tags, and to search the dynamic rules for an applicable rule for routing the file system object; and an object router configured to route the file system object based on the applicable rule.

In an embodiment, the program code further comprises a tagger configured to automatically tag the file system object by changing the file system object to include the one or more tags.

In an embodiment, the program code further comprises a tagger configured to automatically tag the file system object by populating a database with a file system object identifier and the one or more tags associated with the file system object.

In an embodiment, the program code further comprises a user interface configured to generate the dynamic rules and to configure a prioritization mechanism to avoid conflict among the dynamic rules.

In an embodiment, the dynamic rules are based on at least one of a directory level, a file system object level, a file system object property, a file system object content, a date of file system object creation, or a particular date range.

In an embodiment, the rules checker is further configured to search the dynamic rules by selecting the applicable rule to be a first rule of the dynamic rules to match a tag of the one or more tags when there are multiple matches.

In an embodiment, the object router is further configured to avoid routing the file system object to a cloud-based location disallowed by the applicable rule.

In another embodiment, a computing device comprises: at least one file repository that includes memory and a processor configured to manage file system objects created by one or more users in an enterprise, the processor including: a tagger configured to automatically tag a file system object with one or more tags based on at least one of file system object content or file system object location; and a user interface configured to enable generation of dynamic rules that control routing of file system objects to a cloud-based location based on the one or more tags.

In an embodiment, the processor further comprises: a rules checker configured to receive a file system object tagged with the one or more tags and to search the dynamic rules for an applicable rule for routing the file system object.

In an embodiment, the processor further comprises: an object router configured to route the file system object based on the applicable rule.

In an embodiment, the tagger is configured to automatically tag the file system object by at least one of: changing the file system object to include the one or more tags; or populating a database with a file system object identifier and the one or more tags associated with the file system object.

In an embodiment, the dynamic rules are based on at least one of a directory level, a file system object level, a file system object property, a file system object content, a date of file system object creation, or a particular date range.

In an embodiment, the dynamic rules are perpetuated when the file system object is moved to another location.

Conclusion

In accordance with an embodiment, any combination of the above-described embodiments may be utilized depending on the system being implemented While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A computing device, comprising:
a memory storing program code; and
a processor configured to execute the program code to facilitate routing of file system objects by performing operations comprising:
generating a user interface configured to:
enable generation of dynamic rules that control routing of file system objects to a cloud-based location based on one or more tags;
receiving a file system object tagged with at least one tag;
searching the dynamic rules for an applicable rule for routing the file system object, including
finding multiple dynamic rules applicable to the at least one tag,
prioritizing the multiple dynamic rules according to a rule precedent to determine the applicable rule, and
selecting the applicable rule from the prioritized multiple dynamic rules; and
routing the file system object based on the applicable rule.

2. The computing device of claim 1, wherein said searching further comprises:
initially finding no dynamic rules applicable for routing the file system object; and
performing at least one of
waiting until the dynamic rules are updated to search the dynamic rules again, or
waiting until a time window has passed to search the dynamic rules again.

3. The computing device of claim 1, wherein the operations further comprise:
enabling configuration of a prioritization mechanism to apply the rule precedent to avoid conflict among the dynamic rules.

4. The computing device of claim 1, wherein said selecting comprises:
selecting the applicable rule from at least one of:
a first dynamic rule based on a directory level,
a second dynamic rule based on a file system object level,
a third dynamic rule based on a file system object property, or
a fourth dynamic rule based on at least one of a file system object content, a date of file system object creation, or a date range.

5. The computing device of claim 1, wherein the operations further comprise:
automatically tagging the file system object by changing the file system object to include the at least one tag.

6. The computing device of claim 1, wherein the operations further comprise:
avoiding routing the file system object to a cloud-based location disallowed by the applicable rule.

7. The computing device of claim 1, wherein the cloud-based location comprises at least one of a public cloud, a private cloud, or a hybrid cloud.

8. A method, comprising:
generating a user interface configured to enable generation of dynamic rules that control routing of file system objects to a cloud-based location based on one or more tags;
receiving a file system object tagged with at least one tag;
searching the dynamic rules for an applicable rule for routing the file system object, including
finding multiple dynamic rules applicable to the at least one tag,
prioritizing the multiple dynamic rules according to a rule precedent to determine the applicable rule, and
selecting the applicable rule from the prioritized multiple dynamic rules; and
routing the file system object based on the applicable rule.

9. The method of claim 8, wherein said searching further comprises:
initially finding no dynamic rules applicable for routing the file system object; and
performing at least one of
waiting until the dynamic rules are updated to search the dynamic rules again, or
waiting until a time window has passed to search the dynamic rules again.

10. The method of claim 8, further comprising:
enabling configuration of a prioritization mechanism to apply the rule precedent to avoid conflict among the dynamic rules.

11. The method of claim 8, wherein said selecting comprises:
selecting the applicable rule from at least one of:
a first dynamic rule based on a directory level,
a second dynamic rule based on a file system object level,
a third dynamic rule based on a file system object property, or
a fourth dynamic rule based on at least one of a file system object content, a date of file system object creation, or a date range.

12. The method of claim 8, further comprising:
automatically tagging the file system object by changing the file system object to include the at least one tag.

13. The method of claim 8, further comprising:
avoiding routing the file system object to a cloud-based location disallowed by the applicable rule.

14. The method of claim 8, wherein the cloud-based location comprises at least one of a public cloud, a private cloud, or a hybrid cloud.

15. A computing device, comprising:
a memory storing program code; and
a processor configured to execute the program code to facilitate routing of file system objects by performing operations comprising:
tagging a file system object with one or more tags;
receiving the file system object tagged with the one or more tags;
accessing dynamic rules that control routing of file system objects to one or more cloud-based locations based on the one or more tags; and searching the dynamic rules for an applicable rule for routing the file system object.

16. The computing device of claim 15, wherein said tagging comprises:
automatically profiling the file system object to determine the one or more tags.

17. The computing device of claim 15, wherein said tagging comprises:
changing the file system object to include the one or more tags.

18. The computing device of claim 15, wherein said tagging comprises:
populating a database with a file system object identifier and the one or more tags associated with the file system object.

19. The computing device of claim 15, wherein said tagging comprises:
applying a tag to the file system object that classifies the file system object according to at least one of:
a location of the file system object;
a line of business of the file system object;
an ownership of the file system object;
a content of the file system object;
a file size of the file system object; or
a file extension of the file system object.

20. The computing device of claim 15, wherein said searching comprises:
selecting the applicable rule from at least one of:
a first dynamic rule based on a directory level,
a second dynamic rule based on a file system object level,
a third dynamic rule based on a file system object property, or
a fourth dynamic rule based on at least one of a file system object content, a date of file system object creation, or a date range.

* * * * *